(12) United States Patent
Kim et al.

(10) Patent No.: US 7,345,970 B2
(45) Date of Patent: Mar. 18, 2008

(54) RECORDING MEDIUM, METHOD OF CONFIGURING CONTROL INFORMATION THEREOF, RECORDING AND/OR REPRODUCING METHOD USING THE SAME, AND APPARATUS THEREOF

(75) Inventors: Jin Yong Kim, Seongnam-si (KR); Sang Woon Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 593 days.

(21) Appl. No.: 10/885,087

(22) Filed: Jul. 7, 2004

(65) Prior Publication Data
US 2005/0036414 A1 Feb. 17, 2005

(30) Foreign Application Priority Data
Aug. 14, 2003 (KR) .............. 10-2003-0056540
Sep. 15, 2003 (KR) .............. 10-2003-0063591
Sep. 22, 2003 (KR) .............. 10-2003-0065628

(51) Int. Cl.
*G11B 5/09* (2006.01)
*G11B 7/24* (2006.01)

(52) U.S. Cl. .............. 369/47.36; 369/47.21; 369/53.2; 369/47.5; 369/275.1

(58) Field of Classification Search ............ None
See application file for complete search history.

(56) References Cited

U.S. PATENT DOCUMENTS 7,218,585 B2 * 5/2007 Tanii et al. .............. 369/47.36
2002/0048646 A1 4/2002 Tomura et al.
2003/0021201 A1 1/2003 Kobayashi

FOREIGN PATENT DOCUMENTS

EP 968769 1/2000
EP 1172810 1/2002
EP 1471506 A1 10/2007
WO WO 03/067581 1/2003

OTHER PUBLICATIONS

PCT International Search Report, dated Sep. 10, 2004.

* cited by examiner

*Primary Examiner*—Muhammad Edun
(74) *Attorney, Agent, or Firm*—Harness, Dickey & Pierce

(57) ABSTRACT

A method of recording writing speed information and per writing speed write strategy information within disc control information is provided. The standardized disc control information can be uniformly applied to efficiently cope with the record/playback of the optical disc. In configuring disc control information within a management area of an optical disc including at least one recording layer, the method includes steps of providing the at least one disc control information within the management area, the disc control information provided per applicable writing speed to each of the at least one recording layer; and recording applicable recording speed information within the disc control information.

45 Claims, 15 Drawing Sheets

FIG. 6A

Disc information (112 bytes)

| byte number | contents | number of bytes |
|---|---|---|
| 0 | Disc information identifier | 2 |
| 5 | DI frame sequence number in DI block | 1 |
| ... | ... | ... |
| N | Writing speed flag | 1 |
| L | Write strategy (WS) flag | 1 |
| M | Number of recording layer | 1 |
| P~111 | Write strategy (WS) parameters | X |

FIG. 6C

Disc information (112 bytes)

00h: 1x, WS-1, L0 DI (mandatory)
01h: 1x, WS-1, L1 DI (mandatory)
02h: 1x, WS-2, L0 DI (optional)
03h: 1x, WS-2, L1 DI (optional)
04h: 2x, WS-1, L0 DI (optional)
05h: 2x, WS-1, L1 DI (optional)
06h: 2c, WS-2, L0 DI (optional)
07h: 2x, WS-2, L1 DI (optional)
08h: 3rd, WS-2, L0 DI (optional)
09h: 3rd, WS-2, L1 DI (optional)
10h: 3rd, WS-3, L0 DI (optional)
11h: 3rd, WS-3, L1 DI (optional)

| b7 | b6 | b5 | b4 | b3 | b2 | b1 | b0 |
|---|---|---|---|---|---|---|---|
| 8th | 7th | 6th | 5th | 4th | 3rd | 2x | 1x |
| 0b | 0b | 0b | 0b | 0b | 1b | 1b | 1b |

| b7 | b6 | b5 | b4 | b3 | b2 | b1 | b0 |
|---|---|---|---|---|---|---|---|
| WS-8 | WS-7 | WS-6 | WS-5 | WS-4 | WS-3 | WS-2 | WS-1 |
| 0b | 0b | 0b | 0b | 0b | 1b | 1b | 1b |

| byte number | contents | number of bytes |
|---|---|---|
| 0 | Disc information identifier | 2 |
| 5 | DI frame sequence number in DI block | 1 |
| ... | ... | ... |
| N | Writing speed flag (= 0000 0111b) | 1 |
| L | Write stategy (WS) flag (= 0000 111b) | 1 |
| M | Number of recording layer (= 0000 0010b : 2 layers) | 1 |
| P~111 | Write strategy (WS) parameters | X |

Disc information (112 bytes)

| byte number | contents | Number of bytes |
|---|---|---|
| 0 | Disc information identifier | 2 |
| 5 | DI frame sequence number in DI block | 1 |
| ... | ... | ... |
| N | Writing speed flag | 1 |
| L | Write stategy (WS) flag | 1 |
| M | Number of recording layer | 1 |
| Q | Best WS flag in writing speed | 1 |
| P~111 | Write strategy (WS) parameters | X |

RECORDING MEDIUM, METHOD OF CONFIGURING CONTROL INFORMATION THEREOF, RECORDING AND/OR REPRODUCING METHOD USING THE SAME, AND APPARATUS THEREOF

This application claims the benefit of Korean Applications No. 10-2003-0056540 filed on Aug. 14, 2003, No. 10-2003-0063591 filed on Sep. 15, 2003, and No. 10-2003-0065628 filed on Sep. 22, 2003, which are hereby incorporated by reference.

BACKGROUND OF THE INVENTION

1. Field of the Invention

The present invention relates to a method of recording a control information on recording medium, such as a recordable optical disc having at least one recording layer, and more particularly, to a method in which writing speed information and write strategy parameters are included in the disc control information. Also, this invention relates to a method of recording or reproducing data on or from the recording medium using the writing speed information 2. Discussion of the Related Art A high density optical recording medium, known as HD-DVD, is widely used to record and store high-definition video data, large amount program data, and high-quality audio data and so on. The Blu-ray disc represents next-generation HD-DVD technology.

Technological specifications are now being established for the global standardization of the Blu-ray disc, including standards are for the write-once Blu-ray disc (BD-WO) Meanwhile, a rewritable Blu-ray disc, known as the 1x-speed BD-RE and now being discussed, should be compatible with BD-RE discs expected to have higher writing speeds, i.e., the 2x-speed BD-RE and beyond. BD-WO specifications for high writing speed are also in progress. Efficient solutions for coping with the high writing speed of a high-density optical disc are urgently needed, and the specifications established should ensure mutual compatibility.

SUMMARY OF THE INVENTION

Accordingly, the present invention is directed to an optical disc control information recording method that substantially obviates one or more problems due to limitations and disadvantages of the related art.

An object of the present invention is to provide a method of recording disc control information as specified information corresponding to a plurality of writing speeds, by which writing speed information is included in the disc control information so that the recording and reproducing of an optical disc can be performed based on prerecorded disc information.

Another object of the present invention is to provide a data structure for configuring disc control information.

Another object of the present invention is to provide a method of recording, in a specific area of an optical disc, disc control information corresponding to a plurality of writing speeds, by which information for indicating applicability of a specific writing speed per recording layer is recorded, to provide mutual compatibility between like-based discs [0143].

Another object of the present invention is to provide a recording and reproducing method and apparatus thereof, by which user data can be recorded on and reproduced from an optical disc using prerecorded disc control information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in configuring disc control information within a management area of an optical disc including at least one or more recording layers, a method of recording the disc control information of the optical disc according to the present invention includes the steps of providing the at least one disc control information within the management area, the disc control information provided per applicable writing speed to each of the at least one or more recording layers and recording applicable recording speed information within the disc control information.

In another aspect of the present invention, a data structure for indicating recordable speed information is characterized in that the recordable speed information includes a respective recording speed flag to indicate whether a corresponding speed is applicable or not and in that a first speed flag for a fist recording speed lower than a second recording speed is set to be dependent on a second speed flag for the second recording speed.

In another aspect of the present invention, a method of recording data on an optical recording medium includes the step of recording speed information on a specific area of the optical recording medium, wherein the speed information includes a respective recording speed flag to indicate whether a corresponding speed is applicable or not and wherein a first speed flag for a fist recording speed lower than a second recording speed is set to be dependent on a second speed flag for the second recording speed.

In another aspect of the present invention, a method of recording/reproducing data on/from an optical recording medium includes the steps of reading speed information from a specific area of the optical recording medium wherein the speed information includes a respective recording speed flag to indicate whether a corresponding speed is applicable or not and wherein a first speed flag for a fist recording speed lower than a second recording speed is set to be dependent on a second speed flag for the second recording speed and recording the data on a main data area of the optical recording medium based on the read speed information.

In another aspect of the present invention, a recording medium having speed information is characterized in that the speed information includes a respective recording speed flag to indicate whether a corresponding speed is applicable or not and in that a first speed flag for a fist recording speed lower than a second recording speed is set to be dependent on a second speed flag for the second recording speed.

In another aspect of the present invention, an optical disc includes at least one recording layer provided with a recordable area and a recording-disabled or prerecorded area, wherein disc control information is separately recorded within the prerecorded area per the recording layer and wherein applicable recording speed information and write strategy information according to a corresponding writing speed are recorded within the disc control information.

In another aspect of the present invention, an optical disc recording method includes the steps of if an optical disc having at least one recording layer is loaded, reading disc control information written within a management area of the optical disc per writing speed and reading to store applicable recording speed information recorded within the disc control information each and write strategy information fitting a corresponding writing speed, deciding the writing speed of the corresponding recording layer by referring to the stored speed information and write strategy information, and performing recording at the decided writing speed.

In another aspect of the present invention, an optical disc record playback apparatus includes a control unit delivering a recording command and a record playback unit receiving the recording command, the record playback unit performing a recording in a manner of reading disc control information recorded within a management area of an optical disc per writing speed, reading to store applicable recording speed information recorded within the disc control information each and write strategy information recorded by interworking with a corresponding writing speed, deciding a recording speed of a corresponding recording layer by referring to the read information, and performing recording at the decided recording speed.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 6A to 6C are diagrams of disc information recorded according to a third embodiment of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A Blu-ray disc is taken as an example of an optical disc according to the present invention. Yet, the concept of the present invention, characterized in an optical disc having its disc control information recorded thereon, is applicable to DVD-RAM, DVD-RW, DVD+RW, DVD-R, DVD+R, and similar such discs. discs.

Although the terminology used herein is well known for the most part, some terms have been chosen by the applicant, such that the present invention should be understood with the intended meanings of the terminology as used by the applicant. For example, the "disc control information" of a disc is recorded in a specified area, i.e., a recordable area of the disc or a prerecorded area (sometimes known as an embossed area, in which manufacturer data is recorded and where no further recording is possible), and includes information necessary for the playback of a recorded disc. Disc control information is called "disc information" or "DI" in relation to Blu-ray disc technology but is typically referred to as "physical format information" for DVD-RAM, DVD-RW, DVD+RW, DVD-R, and DVD+R discs. Hence, it should be apparent that the technical background of the present invention is equally applicable to physical format information.

Moreover, the disc information according to the present invention is recorded as an unspecified unit of information, which may be counted, for example, as a first or second information.

Figure 1:
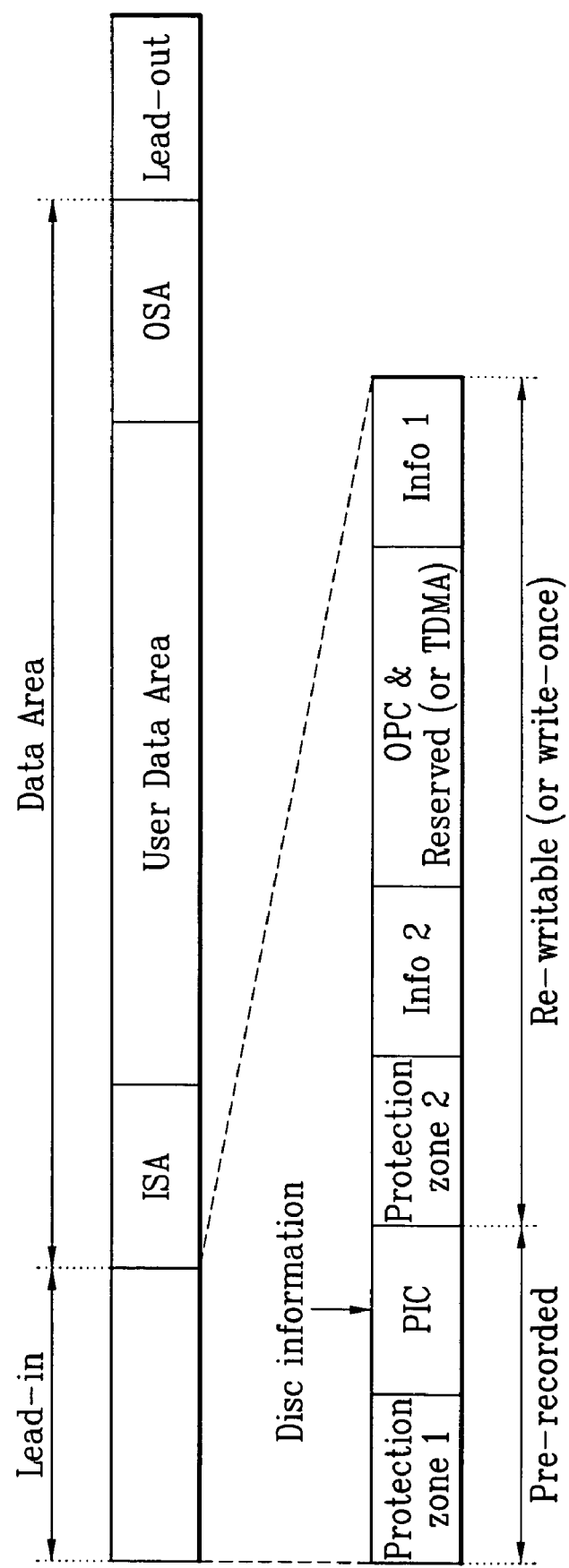
FIG. 1 is a diagram of a single-layer disc applicable to the present invention.
Figure 2:
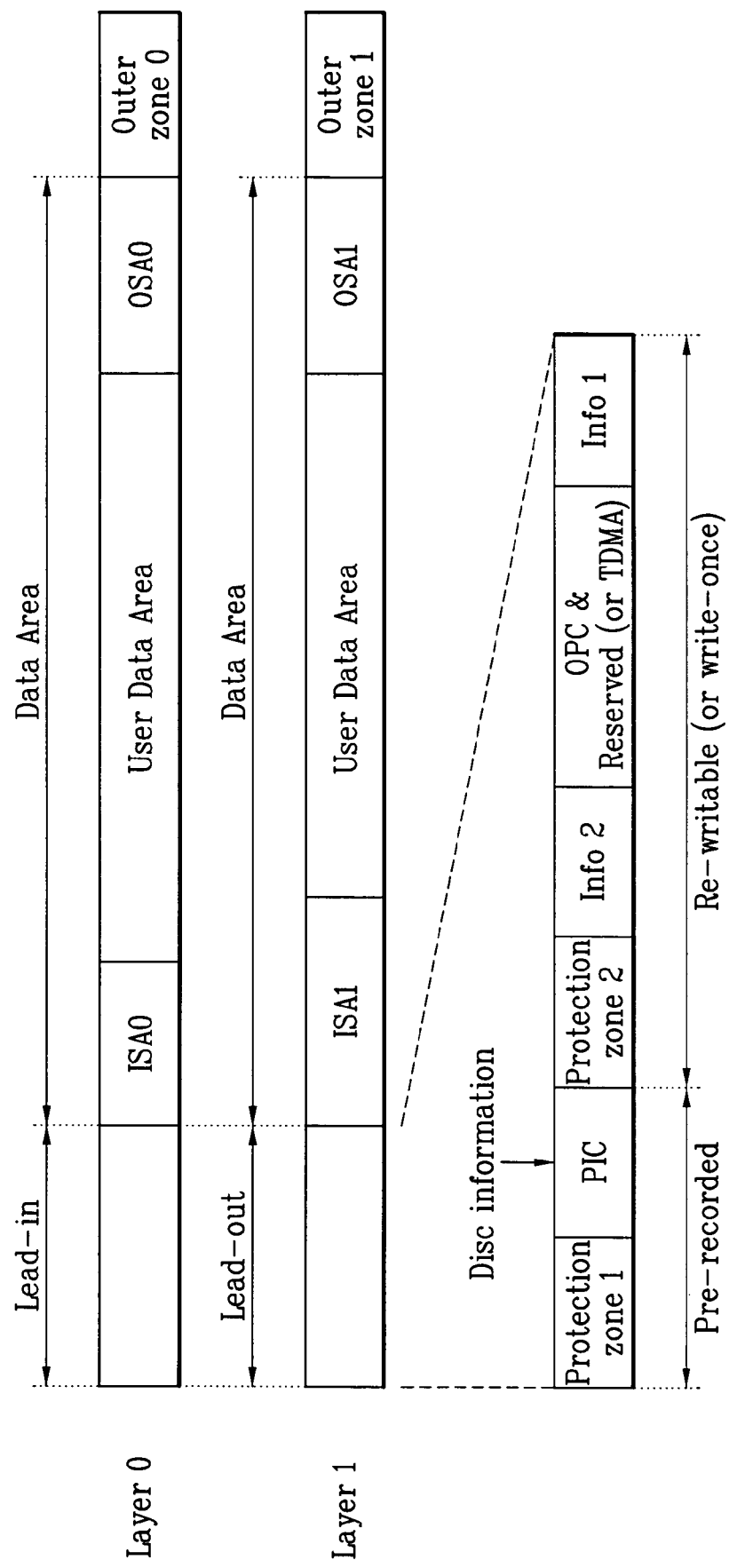
FIG. 2 is a diagram of a dual-layer disc applicable to the present invention.

FIGS. 1 and 2 illustrate the structure of optical discs according to the present invention, in which any recordable optical disc may be applicable to the present invention. The recordable disc may be, for example, a rewritable optical disc or a write-once optical disc.

Referring to FIG. 1, illustrating an optical disc having one recording layer, a lead-in area is provided as a management area on an inner circumference area of an optical disc, whereas a lead-out area is provided as a management area on an outer circumference area of the optical disc. In the inner circumference area, a pre-recorded area and a rewritable (or write-once) area are provided separately. In BD-RE and BD-WO technology, the pre-recorded area is called the PIC area, where permanent information and control data is recorded, and disc information is recorded in the PIC area. A data area is made up of a user data area where user data is recorded and inner and outer spare areas ISA and OSA, which are used in the replacement of the data of a defective area. In the case of a BD-WO disc, a temporary defect management area (TDMA) is provided for recording information of a defect and for general management. The TDMA is unnecessary in the case of BD-RE discs, which have a corresponding area designated as reserved.

The present invention intends to provide a method of recording disc information (DI) as disc control information required for recording and/or reproducing of a disc in a pre-recorded or recordable are. It is apparent that a recording method in the pre-record area is differently applied to each kind of disc. In the case of BD-RE and BD-WO discs, the pre-recorded area is the PIC area recorded using a bi-phased high-frequency modulated signal reproduced according to a specific playback method, to acquire the disc information.

FIG. 2 illustrates an optical disc having dual recording layers, in which an inner circumference area of the disc has a lead-in of a first recording layer (Layer 0) corresponding to a lead-out of a second recording layer (Layer 1). In this case, one PIC area is provided in each of the lead-in and lead-out areas, and the same disc information is recorded in each PIC area.

Figure 3:
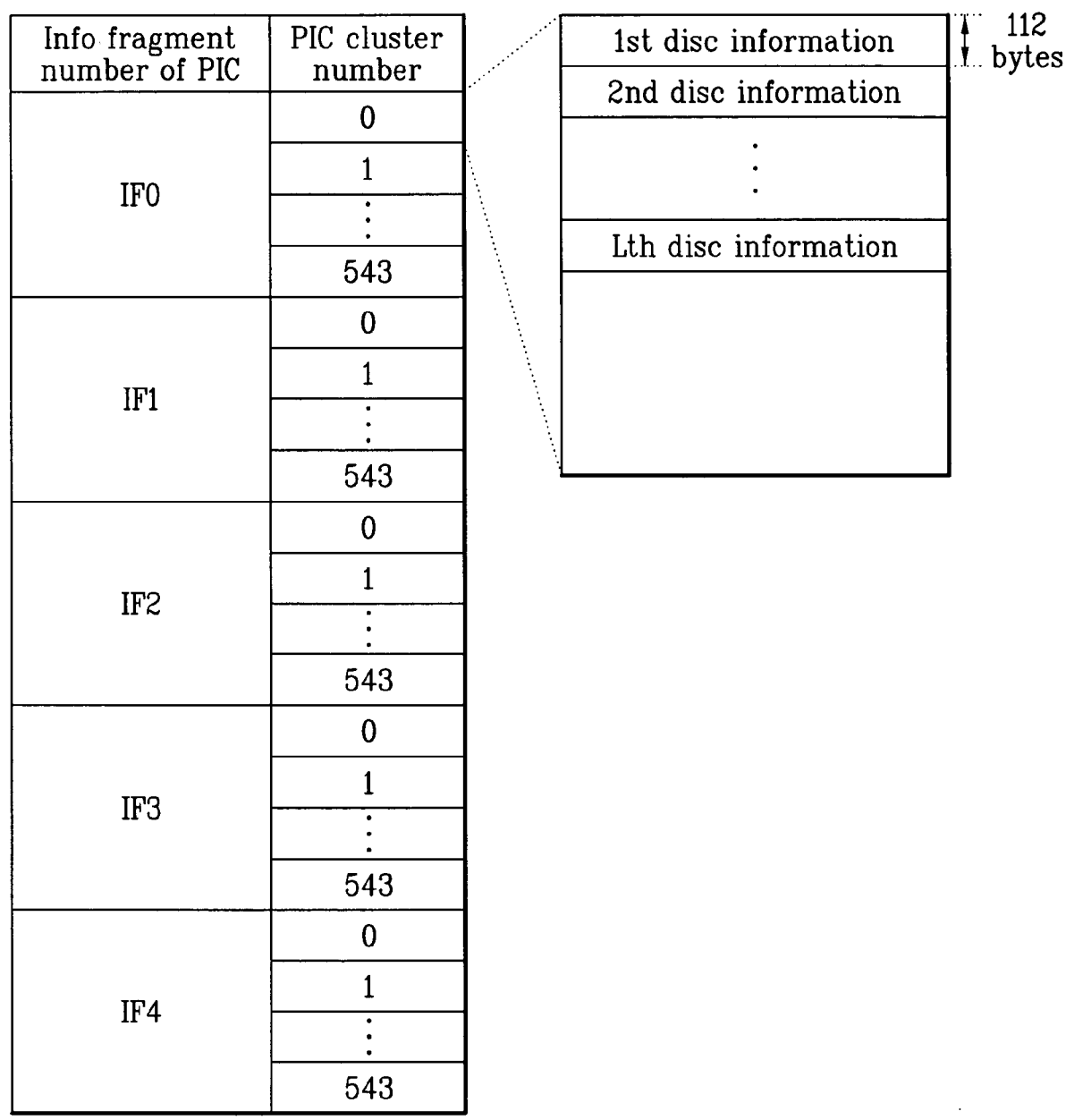
FIG. 3 is a diagram of a management area where disc control information of the present invention is recorded, in which a format of recording the disc information in a corresponding area is schematically shown.

FIG. 3 illustrates a PIC area formatted according to the present invention. In configuring the disc information of the PIC area of a BD-RE or BD-WO disc, the minimum recording unit is one cluster, 544 clusters constitute one fragment as one upper record unit, and five fragments make up the PIC area. Disc information is recorded in a front head cluster of a first fragment IFO. The disc information is plurally recorded per recording layer and recording velocity permitted by the corresponding optical disc. One disc information includes 112 bytes, sometimes referred to as a DI frame. To cope with a loss of disc information, the same contents of the disc information are repeatedly recorded in each front head cluster of the remainder of the fragments.

Information representing the corresponding recording layer, information representing recording velocity, and write strategy information corresponding to the recording velocity are included in each disc information. Such information is utilized in recording and reproducing the optical disc, to provide optimal recording power per recording layer and per recording velocity.

The disc information of the present invention is characterized in providing specific recording velocity information supported by the disc and associated write strategy information, and more specifically, in providing specific recording velocity supported for each recording layer and associated write strategy information via a specified method for discs having a plurality of recording layers.

The specific configuration of the disc information is for a Blu-ray disc, which may differ from the configuration of a DVD-based disc. Specifically, the recording DI volume for a Blu-ray disc is 112 bytes or equivalent. By configuring the disc information of the same recording layer as one information, i.e., without repeating any common information, the write strategy configuration may differ per recording velocity.

FIGS. 4A to 4D are diagrams of recording disc information according to a first of four embodiments of the present invention, in which applicable writing speed information is recorded.

To acquire disc information associated with a specific writing speed of an intended specific recording layer from a plurality of existing disc information, all the disc information should be read, which is time consuming. For instance, if there are four recording layers and eight writing speeds applicable per recording layer, a total of 32 disc information are needed. A recorder/reproducer (FIG. 8) should search all 32 disc information whenever a value of the disc information for the specific recording layer and writing speed is needed. Hence, the present invention is characterized in including disc-applicable writing speed information and a disc's recording layer information (number of layers) in the disc information, to enable a disc information search by a specified method using the recorded information. This information, which determines the sequence of a plurality of disc information, is commonly included (copied) in each disc information, thereby facilitating the access of the disc information for a specific recording layer and writing speed.

Moreover, one write strategy (WS) is recorded within each disc information and identification information for identifying a kind of the corresponding write strategy (WS) is separately recorded, whereby a record playback apparatus (FIG. 8) is facilitated to use the write strategy (WS). Moreover, by selecting to record one write strategy (WS) for a specific writing speed and a specific recording layer in disc information, a disc manufacturer can be provided with convenience.

Figure 4A:
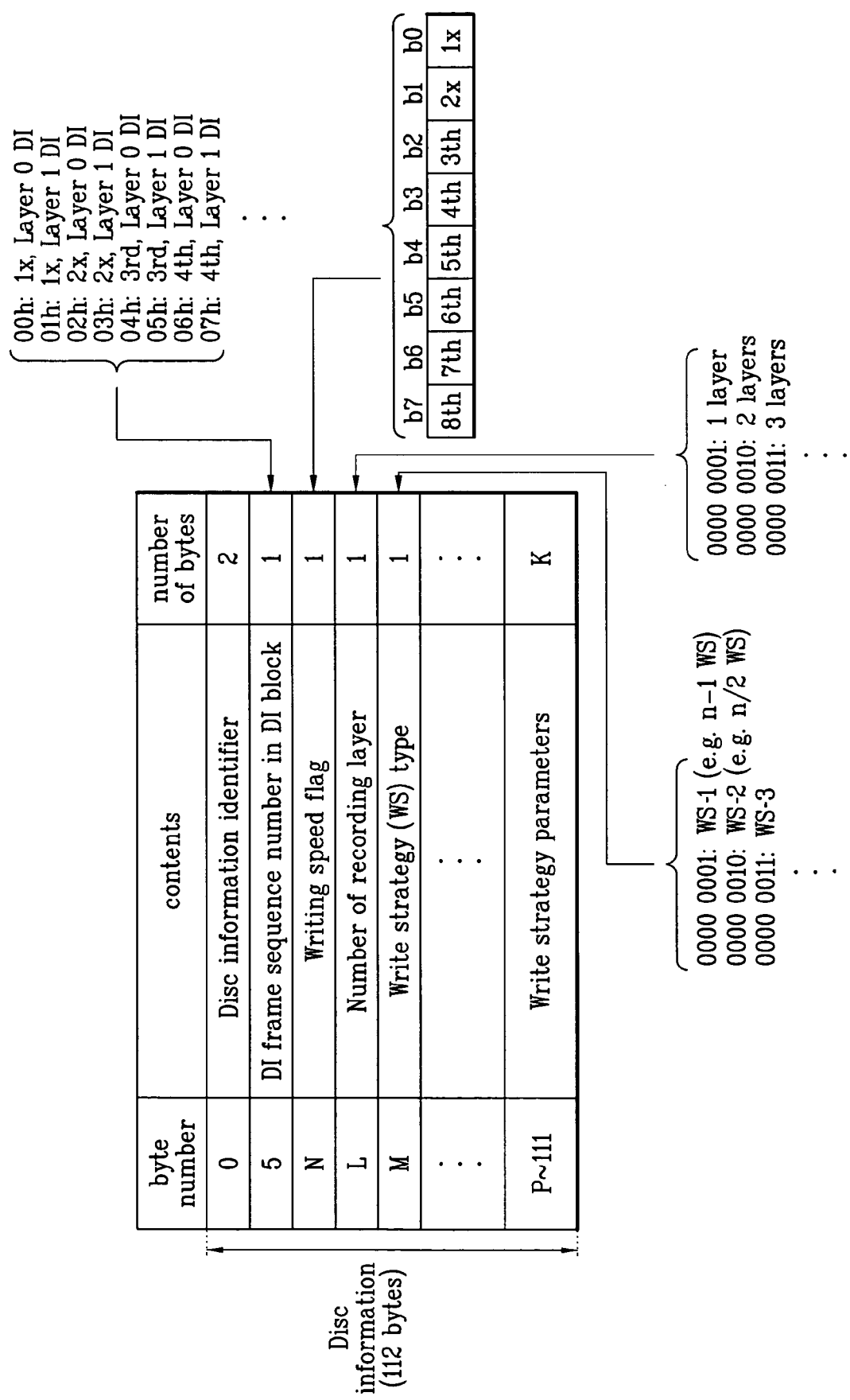
FIGS. 4A to 4D are diagrams of disc information recorded according to a first embodiment of the present invention.

Referring to FIG. 4A, illustrating a disc information structure, each disc information sequence is determined by a sequence number and is recorded using one byte. For instance, the information is recorded in a fifth byte (i.e., the "DI frame sequence number in DI block," which can be represented as 00h, 01h, 02h, 03h, 04h, 05h, 06h, or 07h) of the disc information, where a fifth byte of 00h or 07h indicates a first or eighth disc information, respectively. A meaning of the sequence of the $5^{th}$ byte will be decided by $N^{th}$ and $L^{th}$ bytes that will be explained later.

Writing speed information applicable by a corresponding disc is recorded in a specific area ($N^{th}$ byte) within disc information which is named 'Writing speed flag' field. For instance, whether a specific writing speed of eight eight kinds of writing speeds is applicable by the corresponding disc is represented by 1-bit each in the same area having 1-byte allocated thereto. Namely, it can be defined that the corresponding writing speed is not applicable (supported) if a bit value is '0b' in entire bits or that the corresponding writing speed is applicable (supported) if the bit value is '1b'. Hence, each of the bits b0~b7 within 1-byte becomes flag information indicating applicability of a specific writing speed.

For instance, if 1× speed is applicable by a corresponding disc only, '0000 0001' is written in $N^{th}$ byte. If all of the eight kinds of writing speeds are applicable, '1111 1111' is written in the $N^{th}$ byte.

In the above explanation, 1× and 2× speeds utilized by every disc almost are previously decided to be adopted. Yet, writing speeds decided by specification can be used as the remaining writing speeds from $3^{rd}$ writing speed. For instance, the $3^{rd}$, $4^{th}$, $5^{th}$, $6^{th}$, $7^{th}$, and $8^{th}$ writing speeds may be set to 5×, 6×, 8×, 12×, 14×, and 16× speeds, respectively.

According to the present invention, an allowable writing speed is represented by a bit having a value of "1," and each bit having a value of "0" represents an excluded writing speed. Hence, there can be no case of a lower bit being set to zero while an upper bit is set to one. For example, a disc allowing writing speeds up to the fourth writing speed has writing speed flag of 0000 1111b, and a writing speed flag of, say, 0000 1011b, is barred.

For another example, bits can be independently set. Even if upper bits are set to '1b', it is able to set lower bits to '0b'. In case that a lower writing speed has to be applicable if a maximum writing speed is applicable, write parameters according to the corresponding writing speed should be written altogether. Hence, it may become a considerable load put on an information recording. By rendering a portion of the lower writing speed inapplicable even if the maximum writing speed is applicable, it is able to reduce the corresponding information amount. Furthermore, be using one specific writing parameter, at least two recording speeds can be possible.

Meanwhile, recording layer information indicating the number of recording layer(s) existing within the corresponding disc is recorded in another specific area ($L^{th}$ byte) within the disc information, which is named 'Number of Recording Layer' field. For instance, a value meaning the number of the recording layer(s) can be represented by a binary number in the same area having 1-byte allocated thereto. In case that the recording layer is the single layer in FIG. 1, '0000 0001' is written in the $L^{th}$ byte. In case that the recording layer is the dual layer in FIG. 2, '0000 0010' is written in the $L^{th}$ byte. In case that four recording layers exist, '0000 0100' is written in the $L^{th}$ byte.

Since limitation is put on the number of the currently considered recording layer(s), which is currently two recording layers, 4-bits within the $L^{th}$ byte are enough to represent total fifteen recording layers (in case of '1111'). In such a case, it is apparent that other valid information can be written in the remaining area (4-bits) of the $L^{th}$ byte.

Moreover, identification information for identifying a kind of write strategy (WS) recorded in $P^{th}$~$111^{th}$ bytes is written in another specific area ($M^{th}$ byte) within the disc information, which is named 'Write Strategy (WS) Type' field.

Namely, in the disc information of the present invention, one write strategy (WS) is recorded for a specific writing speed and a specific recording layer and the write strategy is optionally selected from various kinds of specified types by a disc manufacturer. Hence, if the corresponding disc information is a first type write strategy WS-1, '0000 0001' is written in the $M^{th}$ byte. If the corresponding disc information is a second type write strategy WS-2, '0000 0010' is written in the $M^{th}$ byte. Substantial write strategy (WS) is recorded in $P^{th}$~$111^{th}$ bytes. Yet, the substantial write strategy (WS) will be recoded as a value interoperating with the decided write strategy (WS) type in the $M^{th}$ byte. The write strategy (WS) type via the $M^{th}$ byte is optionally recordable in every disc information. It is also possible to apply one specified write strategy (WS) type in basic speed(1× speed) disc information, which is expected to be supported by every record playback apparatus (FIG. 8), in a mandatory manner.

In addition to a method of recording specific parameters of the write strategy (WS), a medium property of a recording layer is generally modified by applying a laser beam to the recording layer within an optical disc via a pickup ('11' in FIG. 8) to perform a recording thereof. Hence, it should be decided an intensity (recording power) of the laser beam, a time of applying the recording power thereto, and the like. The above-decided various kinds of write strategies are named 'Write Strategy (WS)' in general and specific contents recorded within a specific 'Write Strategy (WS)' are named 'Write Strategy (WS) parameters'.

The write strategy (WS) can be recorded in various ways. As a disc becomes highly densified and has higher speed, a writing speed, i.e., disc RPM) as well as the medium property of the recording layer is considerably affected. Hence, a more accurate system is requested. The various write strategies (WS) are explained as follows for example.

First of all, there is a system having a recording pulse smaller by 1 than a recording mark size (n) formed on a recording layer medium, which may be called '(n−1) WS'. Secondly, there is a system having a recording pulse having a size amounting to a half of the recording mark size (n), which may be called 'n/2 WS'. New write strategies (WS) keep being developed. Regarding the different kinds of write strategy (WS), when there exist the various systems of the write strategy (WS) exist as parameters applied to the write strategies (WS) differ from each other, a disc manufacturer tests the recording power according to the write strategy (WS) to be recorded in the selected $M^{th}$ byte and then records a result of the test as write strategy (WS) in the Pth~$111^{th}$ bytes within the disc information.

From the above-recorded 'writing speed information' of the $N^{th}$ byte and the 'recording layer information' of the $L^{th}$ byte, the record/playback apparatus (FIG. 8) recognizes how many disc information exist within the corresponding disc. Namely, the number of the existing disc information is found by multiplying an applicable writing speed number by the number of recording layers. As the present invention applies one write strategy (WS) for a specific writing speed and a specific recording layer, the kind and number of the write strategy (WS) may not be taken into consideration in deciding the number of the number of disc information.

The above-decided information about the number of total disc information can be recorded in a specific area (e.g., $4^{th}$ byte or the like) (not shown in the drawing) within the disc information as well.

Hence, it is able to program a plurality of the above-decided disc information that the sequence is decided by the sequence numbers, which is written in the $5^{th}$ byte in the foregoing description, and that each of the disc information designates the previously decided writing speed and recording layer by the sequence.

For example, by knowing that four writing speeds applicable by a disc exist if the $N^{th}$ byte is '0000 1111' and that two recording layers exist within the disc if the $L^{th}$ byte is '0000 0010', total eight disc information are needed so that the sequence will be '00h~07h'. It is previously decided that disc information of '00h', '01h', '02h', '03h', '04h', '05h', '06h', and '07h' relate to '1× speed, $1^{st}$ recording layer (L0)', '2× speed, $2^{nd}$ recording layer (L1)', '2× speed, $1^{st}$ recording layer (L0)', '2× speed, $2^{nd}$ recording layer (L1)', '$3^{rd}$ writing '$3^{rd}$ writing speed, $1^{st}$ recording layer (L0)', '$3^{rd}$ writing speed, $2^{nd}$ recording layer (L1)', '$4^{th}$ writing speed, $2^{nd}$ recording layer (L1)', and '$4^{th}$ writing speed, $2^{nd}$ recording layer (L1)', respectively.

In the above-explained example, the writing speed is preferentially taken into consideration. Yet, it is apparent that the recording layer can be preferentially taken into consideration. Namely, it can be defined in the sequence of $1^{st}$ recording layer (L0), 1× speed', '$1^{st}$ recording layer (L0), 2× speed', and the like Hence, in order to acquire the disc information for a specific target writing speed and a specific target recording layer, the record playback apparatus (FIG. 8) is facilitated to check which disc information is related to the specific target writing speed and recording layer from 'writing speed information' of the $N^{th}$ byte and 'recording layer information' of the $L^{th}$ byte commonly recorded within the respective disc information instead of playing back to check the entire disc information.

Figure 4B:
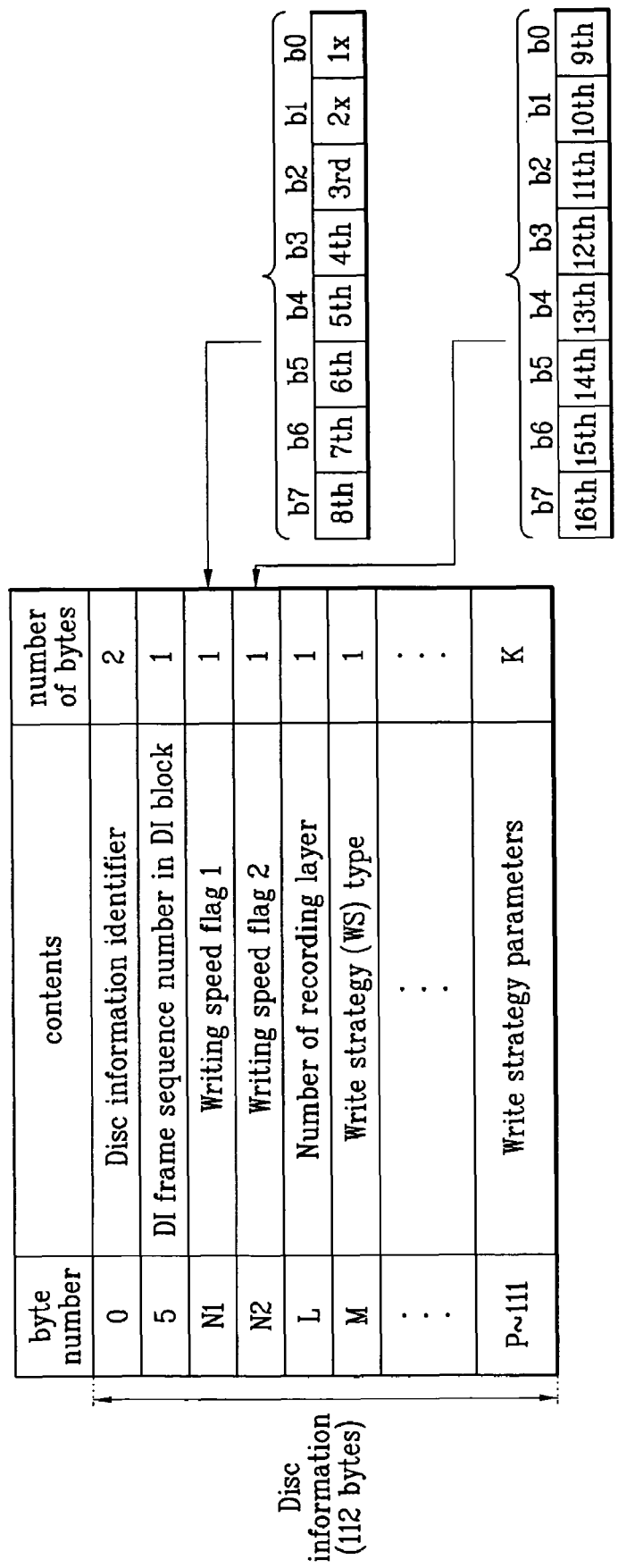

FIG. 4B shows an example of extending the first embodiment of the present invention in FIG. 4A. In case that writing speeds applicable by a disc exceed eight kinds, $N^{th}$ byte ('Writing speed flag' field) in FIG. 4A is extended to indicate presence or non-presence of applicability of $1^{st}$ to $8^{th}$ writing speeds by a flag in $N1^{th}$ byte ('Writing speed flag 1' field), and another byte is allocated to display presence or non-presence of applicability of $9^{th}$~$16^{th}$ writing speeds by a flag in $N2^{th}$ byte. Contents written in the remaining bytes are equivalent to those of the first embodiment of the present invention in FIG. 4A.

Figure 4C:
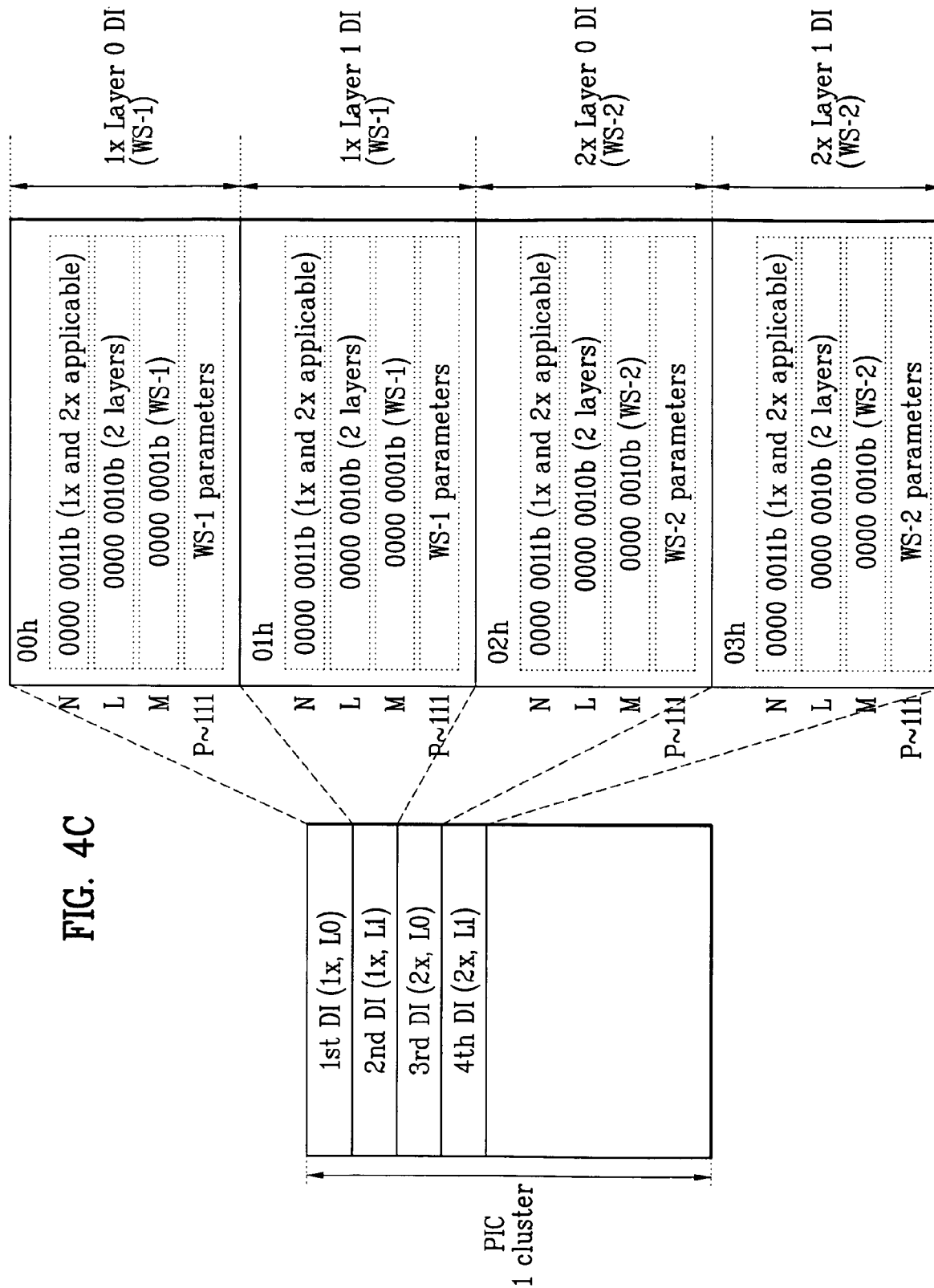

FIG. 4C shows an example of recording disc information by the first embodiment of the present invention in FIG. 4A. It can be known that there are two applicable writing speeds (1× and 2×) from $N^{th}$ byte ('0000 0010b') commonly recorded in the entire disc information and that two recording layers exist within a disc from $L^{th}$ byte ('0000 0010b').

Hence, in the example of FIG. 4C, total four disc information (two recording layers multiplied by two writing speeds) exist and a sequence of the disc information becomes '00h' (1×, L0)→'01h' (1×, L1)→'02h' (2×, L0)→'03h' (2×, L1). This is a specified content according to a predetermined sequence and, as mentioned in the foregoing description, can be rendered into a different sequence by a specification.

An intrinsic write strategy (WS) is recorded in other bytes within each disc information as well as $N^{th}$ and $L^{th}$ bytes.

Specifically, information of a type of a write strategy (WS) written in $P^{th} \sim 111^{th}$ bytes within the corresponding disc information is recorded in $M^{th}$ byte. Namely, information in the $M^{th}$ byte can be different from that in the $P^{th} \sim 111^{th}$ bytes.

In the example in FIG. 4C, '00h' (1×-speed, L0) and '01h' (1×-speed, L1) relate to the application of a first type write strategy (WS-1) and '02h' (2×-speed, L0) and '03h' (2×-speed, L1) relate to the application of a second type write strategy (WS-2).

Figure 4D:
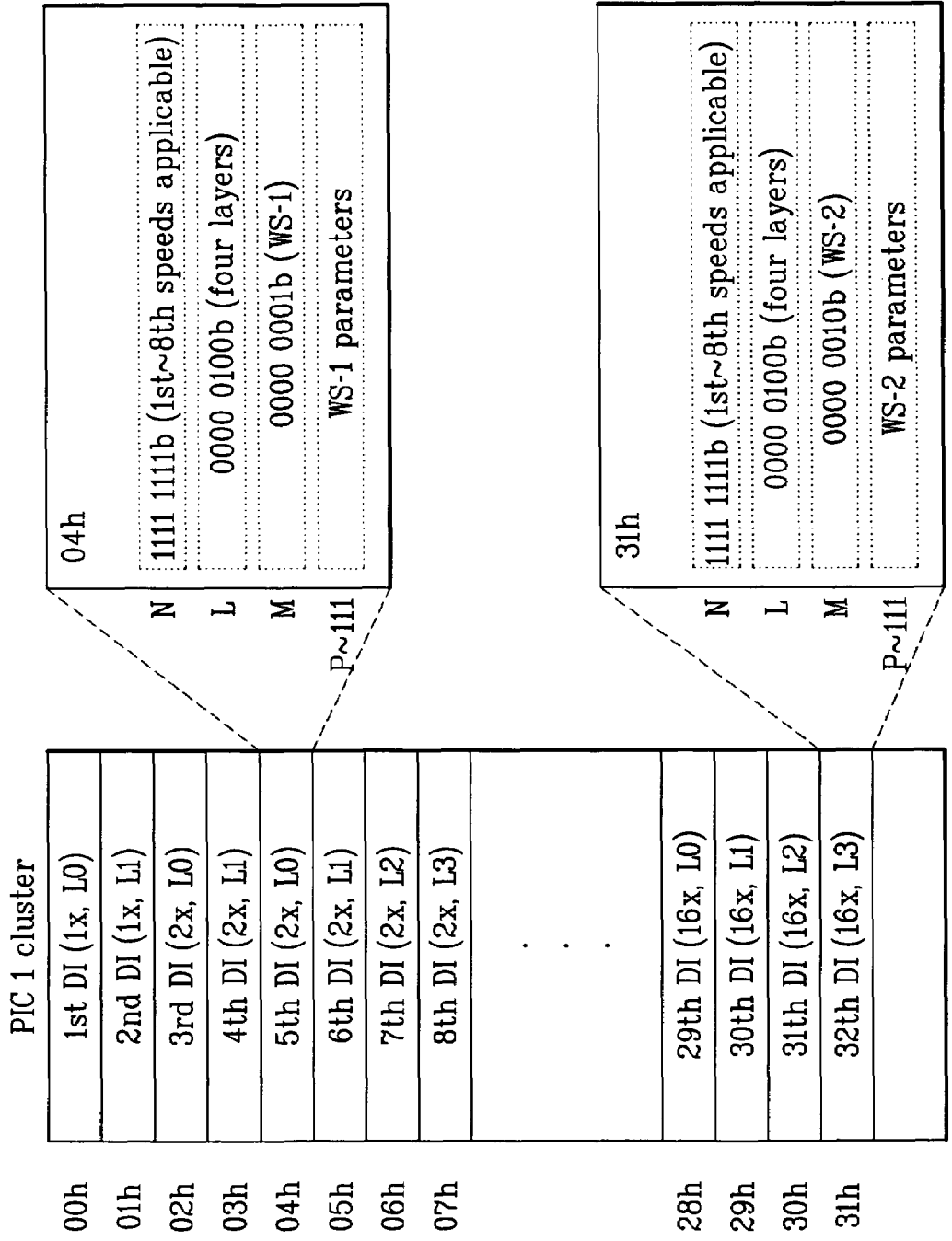

FIG. 4D shows another example of recording disc information by the first embodiment of the present invention in FIG. 4A. It can be known that there are eight applicable writing speeds (1× through 8×) from $N^{th}$ byte ('1111 1111b') commonly recorded in the entire disc information and that four recording layers exist within a disc from $L^{th}$ byte ('0000 0100b'). Hence, in the another example of FIG. 4D, total thirty-two disc information (four recording layers multiplied by eight writing speeds) exist and a sequence of the disc information becomes '00h' (1×, L0)→'01h' (1×, L1)→'02h' (1×, L2)→'03h' (1×, L4)→'04h' (2×, L0)→ . . . →'31h' (16×, L4).

An intrinsic write strategy (WS) is recorded in other bytes within each disc information as well as $N^{th}$ and $L^{th}$ bytes. Specifically, information of a type of a write strategy (WS) written in $P^{th} \sim 111^{th}$ bytes within the corresponding disc information is recorded in $M^{th}$ byte. Namely, information in the $M^{th}$ byte can be different from that in the $P^{th} \sim 111^{th}$ bytes.

In the another example of FIG. 4D, if a record playback unit (FIG. 8) intends to search disc information related to 2×-speed of a first recording layer to perform recording by applying a write strategy (WS) within the corresponding disc information, it can be known from the information in the $N^{th}$ and $L^{th}$ bytes commonly recorded in the entire disc information that total thirty-two disc information (four recording layers multiplied by eight writing speeds) exist in the corresponding disc according to the sequence of the disc information, namely, '00h' (1×-speed, L0) through '31h' (16×-speed, L4). Hence, the record playback apparatus (FIG. 8) enables to recognize that the disc information related to the 2×-speed of the first recording layer to be searched is '04h' and that the corresponding disc information ('04h') is recorded as the first type write strategy (WS-1) from the write strategy (WS) type identification information ('0000 0002b') recorded in the $M^{th}$ byte within the corresponding information ('04h'), thereby reading out parameter values of the first type write strategy (WS-1) via the $P^{th} \sim 111^{th}$ bytes to utilize in the recording.

Likewise, if intending to search disc information related to 16×-speed of a fourth recording layer to perform recording by applying a write strategy (WS) within the corresponding disc information, the record playback unit (FIG. 8) recognizes that the corresponding disc information is '31h' via the same process and that the write strategy type (WS) is the second type (WS-2), thereby enabling to utilize them in the recording.

Therefore, if a host or a control unit ('20' in FIG. 8) requires the recording in a specific recording layer at a specific writing speed the record playback apparatus (FIG. 8) is facilitated to search the corresponding information, thereby enabling to confirm the write strategy (WS) recorded within the corresponding disc information.

Figure 5A:
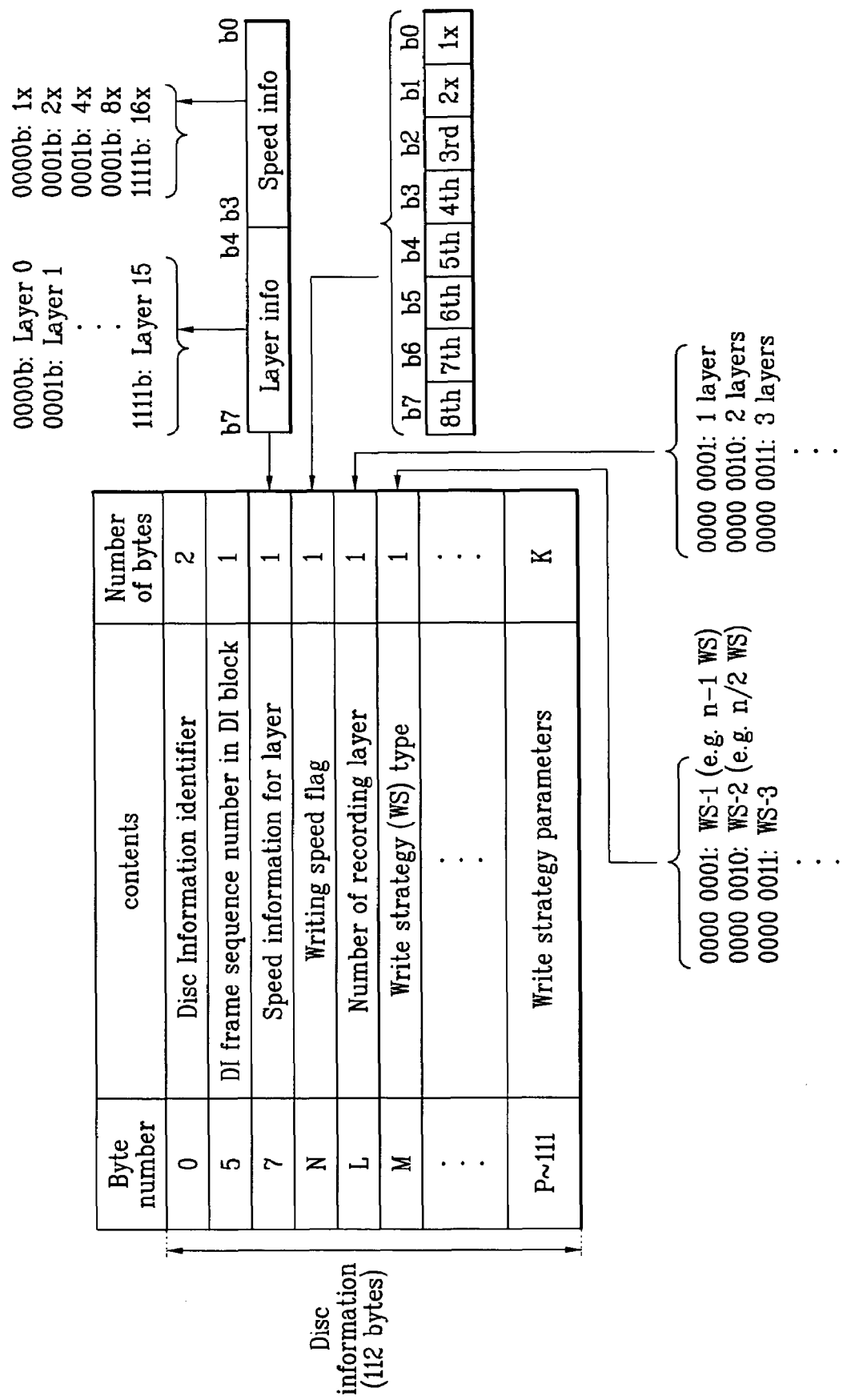
FIGS. 5A to 5B are diagrams of disc information recorded according to a second embodiment of the present invention.

FIG. 5A shows a method of recording disc information according to a second embodiment of the present invention. In order to search disc information related to a specific writing speed and recording layer like the first embodiment of the present invention in FIG. 4A, writing speed information ('writing speed flag' field) applicable by a disc is recorded in $N^{th}$ byte and recording layer information ('Number of Recording Layer' field) existing within the disc is recorded in $L^{th}$ byte. A second embodiment according to the present invention is characterized in that intrinsic recording layer information and writing speed information of the corresponding disc information are additionally recorded in a corresponding specific area ($7^{th}$ byte).

Figure 8:
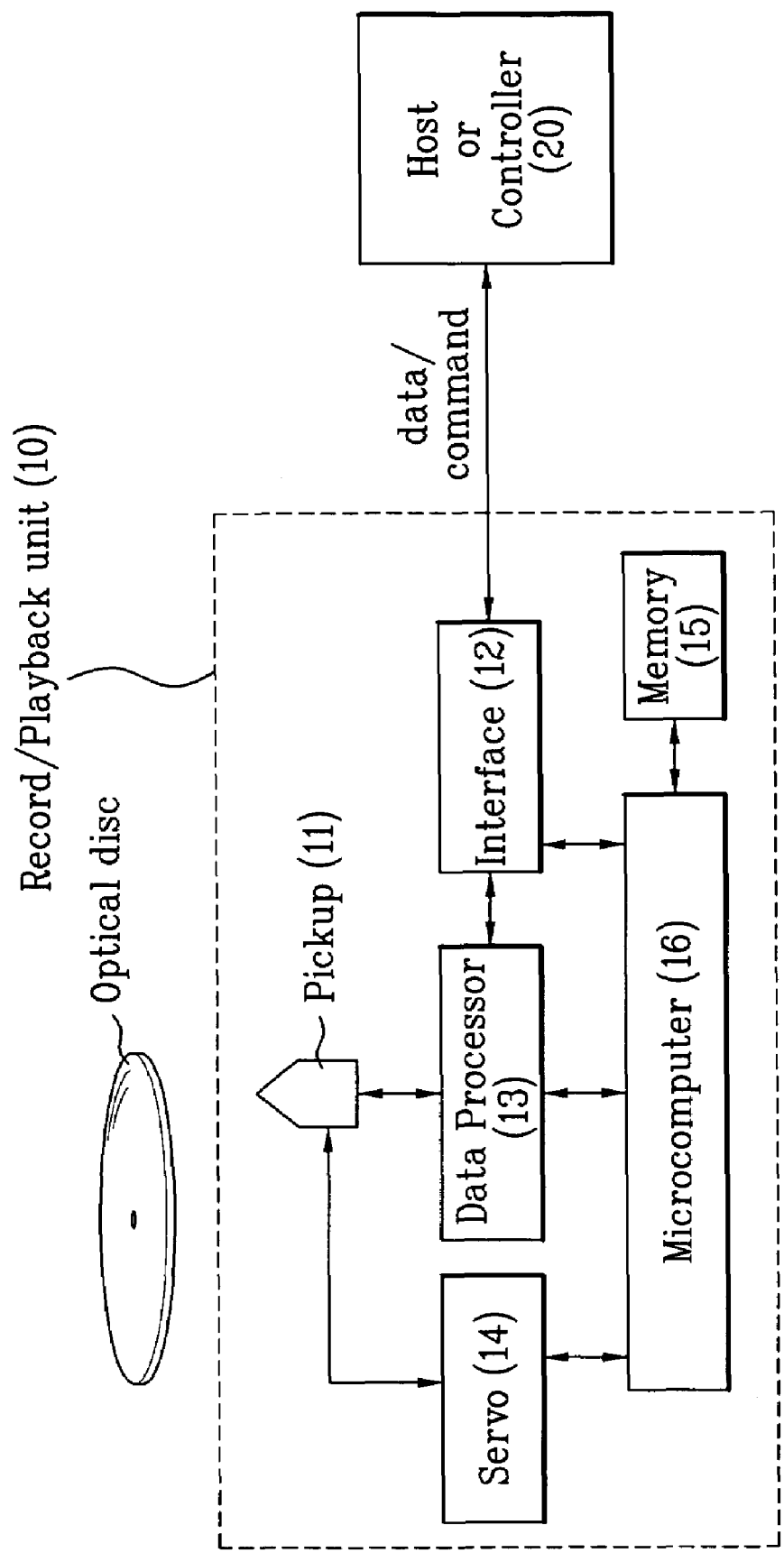
FIG. 8 is a block diagram of an optical disc recording and reproducing apparatus using disc control information according to the present invention.

Namely, in the same manner of the first embodiment of the present invention in FIG. 4A, after the disc information for the specific writing speed and recording layer has been searched, the recording layer information and the writing speed information corresponding to each disc information are directly recorded in each disc information to confirm (verify) whether the search disc information is related to the requested specific writing speed and recording layer. This is necessary for coping with error detection of the disc information since the disc information is very important for recording and management of the disc. Moreover, if the intrinsic writing speed and recording layer information are directly recorded in the disc information each, the method of searching the disc information quickly like in the first embodiment of the present invention can be programmed as well as the method of searching the disc information using the $7^{th}$ byte only according to the second embodiment of the present invention in aspect of designing the record playback apparatus (FIG. 8). Hence, it is advantageous in that a degree of freedom can be given to the freedom can be given to the design thereof.

In the second embodiment (FIG. 5A), the $N^{th}$, $L^{th}$, $M^{th}$, and P~$111^{th}$ bytes have the same content as described in the first embodiment (FIG. 4A). The characterizing $7^{th}$ byte ('Speed information for Layer' field) is divided into upper 4-bits b0~b3 where writing speed information (speed info) is recorded and lower 4-bits b4~b7 where recording layer information (Layer info) is recorded. Unlike the information recorded in the $N^{th}$ and $L^{th}$ bytes, the writing speed information and the recording layer information mean an intrinsic value of the corresponding disc information.

For instance, in order for the upper 4-bits b0~b3 of the $7^{th}$ byte to represent maximum 16× speed, it is defined that '0000b', '0001b', and '1111b' mean 1×-speed, 2×-speed, and 16×-speed, respectively. The lower 4-bits of the $7^{th}$ byte is rendered to directly display a value of the recording layer. It is defined that '0000b', '0001b', and '1111b' mean $1^{st}$ recording layer L0, $2^{nd}$ recording layer L1, and $16^{th}$ recording layer L15, respectively.

Hence, if the corresponding disc information is the 2×-speed associated information of the second recording layer, the $7^{th}$ byte becomes '0001(L1) 0001(2×)'.

Figure 5B:
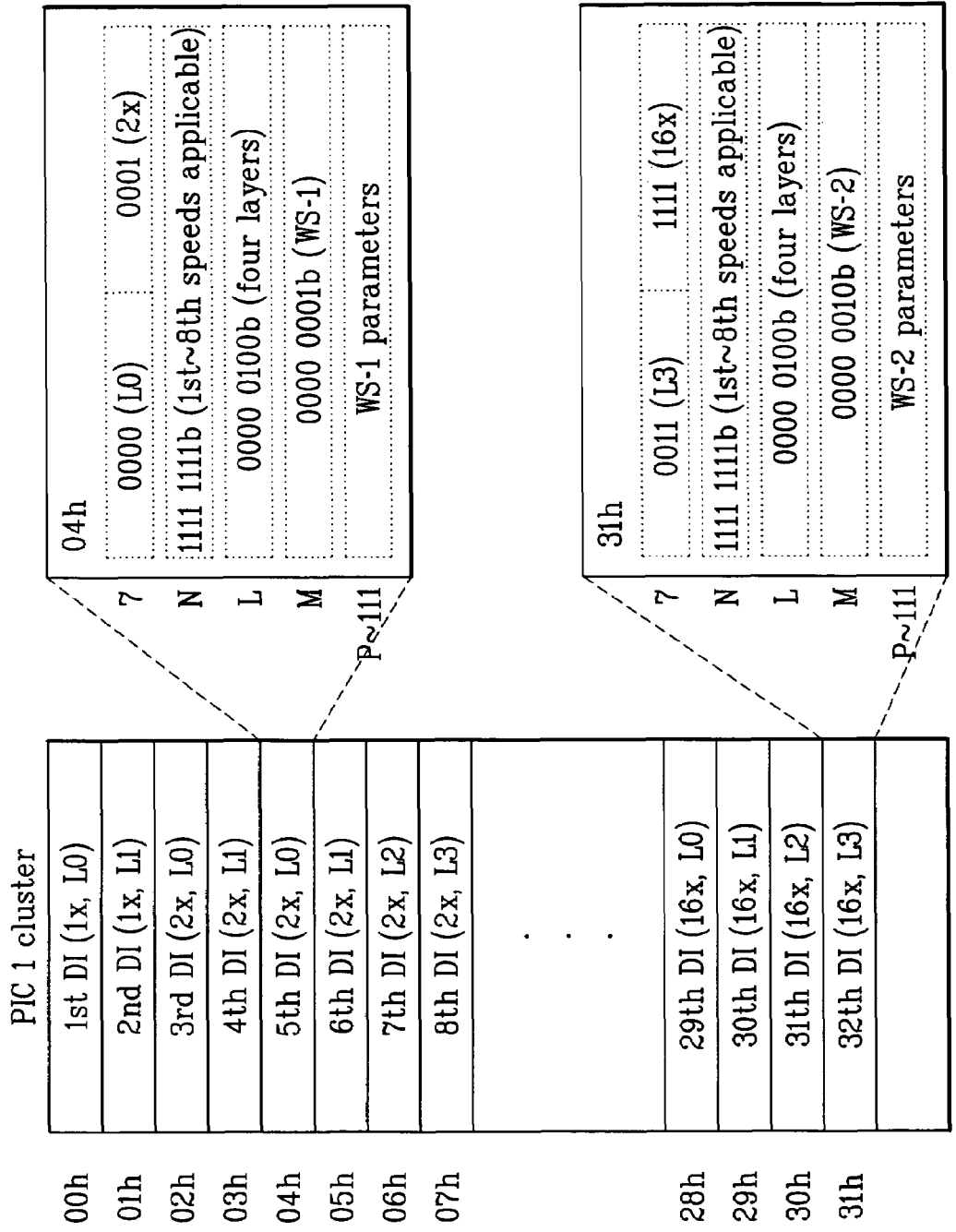

FIG. 5B shows an example of recording disc information according to the second embodiment of the present invention in FIG. 5A in which total thirty-two disc information exist by four recording layers and eight writing speeds.

FIG. 5B is different from FIG. 4D in that the $7^{th}$ byte within each of the disc information possesses the intrinsic writing speed information and recording layer values of the corresponding disc information but is equivalent to FIG. 4B in that the remaining portions (field) within the disc information are equal to those in FIG. 4D.

Hence, the 2×-speed associated disc information of the $1^{st}$ recording layer enables to inform that the disc information of '04h' corresponds to it using the $N^{th}$ and $L^{th}$ bytes like the example of FIG. 4D. Yet, in FIG. 5B, it is confirmed (verified) that the corresponding disc information ('04h') coincides with the disc information for the requested specific writing speed and recording layer from '0000(L0) 0001(2×)' written in the $7^{th}$ byte within the corresponding disc information ('04h').

Figure 6B:
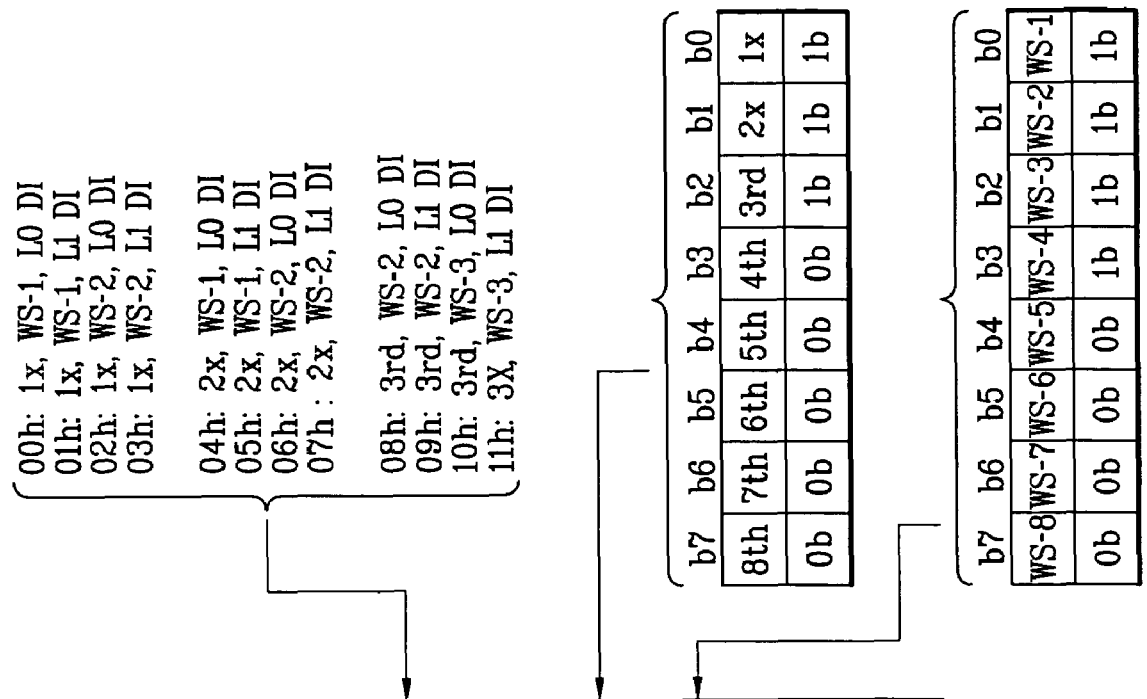

FIGS. 6A to 6C are diagrams of recording disc information according to a third embodiment of the present invention, in which a disc manufacturer enables to optionally record a specific one among a plurality of write strategy (WS) kinds to secure disc manufacturer's convenience and to enable an efficient recording of disc information.

Specifically, a third embodiment according to the present invention is characterized in that, in recording various kinds of write strategies (WS) within disc information, the write strategy (WS) kinds amounting to a per writing speed specific number (e.g., m, where m<n) among the various kinds (e.g., n-kinds) of the write strategies (WS) specified for disc manufacturer's (or disc information writer's) convenience are optionally recordable only and that, for convenience of a manufacturer developing an optical record playback apparatus (FIG. 8) performing an optical recording using the above-recorded disc information, information indicating which is an optimal write strategy (WS) among a plurality (m) of write strategies (WS) recorded within the disc information is recorded within the disc information.

A method of recording disc information according to a third embodiment of the present invention is explained by referring to FIGS. 6A to 6C as follows.

FIG. 6A schematically shows fields recorded within disc information.

Referring to FIG. 4A, a sequence for disc information each is decided by a sequence number and is recorded by 1-byte. For instance, the information is recorded in a $5^{th}$ byte within disc information, is named 'DI frame sequence number in DI block', and is briefly represented by '00h, 01h, 02h, . . . '. Namely, if the information of the $5^{th}$ byte is '00h', it means $1^{st}$ disc information. If the information of the $5^{th}$ byte is '07h', it means $8^{th}$ disc information.

Writing speed information applicable by a corresponding disc is recorded in a specific area ($N^{th}$ byte) within disc information, which is named 'Writing speed flag' field. For instance, whether a specific writing speed of eight kinds of writing speeds is applicable by the corresponding disc disc is represented by 1-bit each in the same area having 1-byte allocated thereto. Namely, it can be defined that the corresponding writing speed is not applicable (supported) if a bit value is '0b' in entire bits or that the corresponding writing speed is applicable (supported) if the bit value is '1b'. Hence, each of the bits b0~b7 within 1-byte becomes flag information indicating applicability of a specific writing speed. For instance, if 1× speed is applicable by a corresponding disc only, '0000 0001b' is written in $N^{th}$ byte. If all of the eight kinds of writing speeds are applicable, '1111 1111b' is written in the $N^{th}$ byte.

In the above explanation, 1× speed (1×) and 2× speed (2×) utilized by every disc almost are previously decided to be adopted. Yet, writing speeds decided by specification can be used as the rest writing speeds from $3^{rd}$ writing speed. For instance, it is possible to set $3^{rd}$, $4^{th}$, $5^{th}$, $6^{th}$, $7^{th}$, and $8^{th}$ writing speeds ($3^{rd}$×, $4^{th}$×, $5^{th}$×, $6^{th}$×, $7^{th}$×, $8^{th}$×) to 5×, 6×, 8×, 12×, 14×, and 16× speeds, respectively.

And, information of informing a kind of write strategy (WS) applicable by a specification of a corresponding disc is recorded in another specific area ($L^{th}$ byte) within the disc information, which is named 'Write Strategy (WS) flag' field. For instance, whether a specific write strategy (WS) of eight kinds of write strategies (WS) is applicable by the corresponding disc is represented by 1-bit each in the same area having 1-byte allocated thereto.

Namely, it can be defined that the corresponding write strategy (WS) is not applicable (supported) if a bit value is '0b' in entire bits or that the corresponding write strategy (WS) is applicable (supported) if the bit value is '1b'. Hence, each of the bits b0~b7 within 1-byte becomes flag information indicating applicability of a specific write strategy (WS). For instance, if $1^{st}$ to $3^{rd}$ type write strategies (WS1 to WS3) are applicable by a corresponding disc only, '0000 0001b' is written in $L^{th}$ byte. If all of the eight types of write strategies (WS1 to WS8) are applicable, '1111 1111b' is written in the $L^{th}$ byte.

In doing so, a setup state of lower bits is not decided according to a setup state of upper bits. Instead, the lower bits are independently set, respectively. For instance, if the $1^{st}$ and $3^{rd}$ type write strategies WS1 and WS3 are applicable but the $2^{nd}$ type write strategy WS2 is inapplicable, the $L^{th}$ byte will be set to '0000 0101b'.

Meanwhile, recording layer information indicating the number of recording layer(s) existing within the corresponding disc is recorded in another specific area ($M^{th}$ byte) within the disc information, which is named 'Number of Recording Layer' field. For instance, a value meaning the number of the recording layer(s) can be represented by a binary number in the same area having 1-byte allocated thereto. In case that the recording layer is the single layer (one recoding layer) in FIG. 1, '0000 0001b' is written in the $M^{th}$ byte. In case that the recording layer is the dual layer (two recording layers) in FIG. 2, '0000 0010b' is written in the $M^{th}$ byte. In case that four recording layers exist, '0000 0100b' is written in the $M^{th}$ byte.

And, parameters of a selected write strategy (WS) are written in another specific area ($P^{th}$~$111^{th}$ bytes) within the disc information, which is named 'Write Strategy (WS) parameters' field.

By writing the $N^{th}$, $L^{th}$, and $M^{th}$ byte information recorded within the disc information by the same values in common to the entire disc information, respectively, the record playback apparatus (FIG. 8) is facilitated to acquire the information of the writing speed applicable by the corresponding disc, the write strategy (WS) kind, and the number of the recording layers despite playing back any disc information. And, from the acquired information, the record playback apparatus (FIG. 8) enables to decide a sequence of the disc information recorded within the disc, the writing speed and recording layer meant by the sequence, and the corresponding write strategy (WS) kind or type.

FIG. 6B shows an example of recording disc information according to the third embodiment of the present invention in FIG. 6A, in which three kinds of writing speeds are applicable so that N th byte becomes '0000 0111b', in which four kinds of write strategies (WS) are applicable so that $L^{th}$ byte becomes '0000 1111b', and in which two recording layers exist within a disc so that $M^{th}$ byte becomes '0000 0010b'.

Hence, it may be able to record disc information per writing speed, per recording layer, and per write strategy (WS) type. Yet, in such a case, the number of the recorded disc information excessively increases. Moreover, a disc manufacturer should test the entire write strategy (WS) types and record the test results within the disc information, whereby it becomes a burden.

Therefore, in the third embodiment according to the present invention, write strategies (WS) of which number (m) is smaller than that (n) of the maximum applicable write strategy types are recordable within disc information and a disc manufacturer further enables to optionally record a specific one of a plurality of write strategies (WS), whereby disc manufacturer's convenience is secured as well as an efficient recording of disc information is enabled.

FIG. 6B shows a recording example using $1^{st}$ and $2^{nd}$ type write strategies WS1 and WS2 for 1× speed (1×), $1^{st}$ and $2^{nd}$ type write strategies WS1 and WS2 for 2× speed (2×), and $2^{nd}$ and $3^{rd}$ type write strategies WS2 and WS3 for $3^{rd}$ writing speed ($3^{rd}$×)

Namely, it is able to record disc information using write strategy (WS) types (kinds) of which number (two) is smaller than that (four) of the entire applicable write strategy (WS) types (kinds).

Specifically, regardless of the number of the applicable write strategy (WS) types, a disc manufacturer preferably selects two of the applicable write strategy (WS) types to perform recording per writing speed. Thus, a degree of freedom of optional recording is secured for the disc manufacturer as well as the number of disc information recorded within a disc can be appropriately adjusted.

FIG. 6C shows another example of recording disc information according to the third embodiment of the present invention in FIG. 6A. Like FIG. 6B, there are three kinds of applicable writing speeds and $N^{th}$ byte is set to '0000 0111b'. There are four applicable write strategy (WS) types and $L^{th}$ byte is set to '0000 1111b'. There are two recording layers existing within a disc and $M^{th}$ byte is set to '0000 0101b'.

Specifically, in FIG. 6C, a specific write strategy (WS) is recorded in a mandatory manner in case of 1× speed (1×) or the write strategy (WS) can be recorded in an optional manner in case of the rest writing speeds.

Namely, in case of recording two kinds of write strategy (WS) types per writing speed, $1^{st}$ type write strategy WS1 is preferentially recorded in a mandatory manner in case of 1× speed (1×) and one of $2^{nd}$ to $4^{th}$ type write strategies WS2 to WS4 is optionally selected to be recorded. In FIG. 6C, the $2^{nd}$ type write strategy WS2 is selected to be recorded.

Moreover, in 2× speed (2×) or $3^{rd}$ writing speed ($3^{rd}$×), without the above-explained limitation, two of the four kinds of write strategies WS1 to WS4 are selected to be recorded.

The specific write strategy (WS) is recorded for the 1× speed in a mandatory manner. This is to enable a manufacturer or developer of a record playback apparatus (FIG. 8) to develop low-price products coping with one specific write strategy (WS) only as well as products coping with the entire write strategy (WS) types, thereby facilitating to various kinds of products.

Hence, the writing speed allocating the write strategy (WS) in a mandatory manner can be set to such a higher higher speed as 2× speed and the like instead of 1× speed in specific specifications. And, it is apparent that the technical idea of the present invention is simply extended to such an application according to the technological development.

Figure 7A:
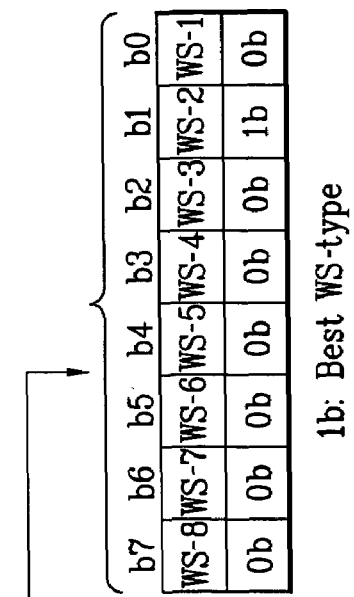
FIGS. 7A and 7B are diagrams of disc information recorded according to a fourth embodiment of the present invention.
Figure 7B:
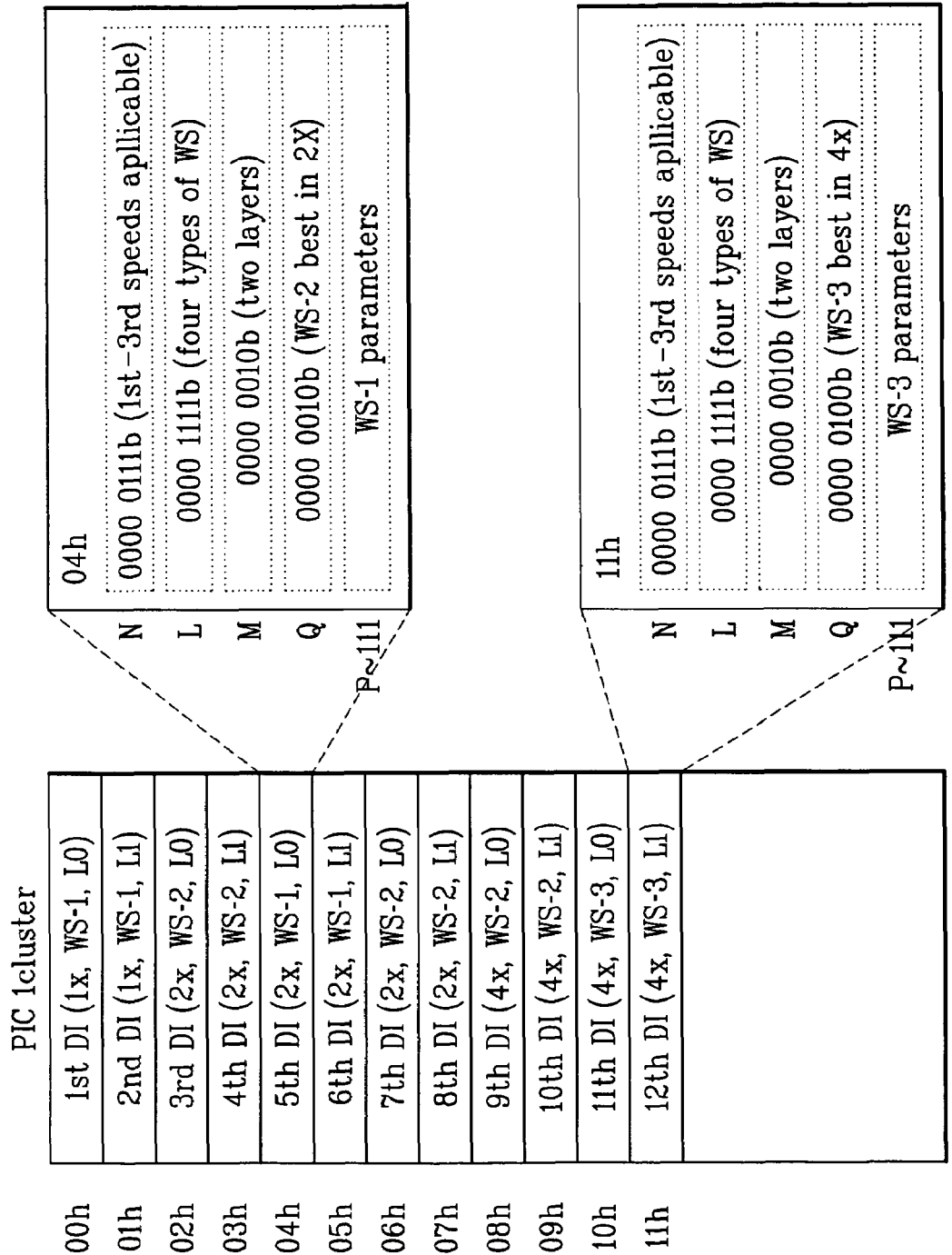

FIG. 7A and FIG. 7B are diagrams of recording disc information according to a fourth embodiment of the present invention, in which disc information structures are schematically shown. The fourth embodiment of the present invention is characterized in that a disc manufacturer records information indicating which is an optimal write strategy (WS) among a plurality of write strategy (WS) types recorded within disc information within a separate area of the disc information.

Namely, by recording the information indicating the optimal write strategy (WS), a record playback apparatus (FIG. 8) enables to set up an optimal write strategy (WS) type quickly, thereby enabling to efficiently perform a recording by a command of a control unit ('20' in FIG. 8).

FIG. 7A shows a concept of recording disc information according to a fourth embodiment of the present invention, in which $N^{th}$, $L^{th}$, and $M^{th}$ bytes explained in the third embodiment of the present invention mean the same contents and in which information indicating an optimal write strategy (WS) among a plurality of write strategy (WS) types is additionally recorded in $Q^{th}$ byte.

Referring to FIG. 7A, $Q^{th}$ byte of disc information is named 'Best WS flag in writing speed' field and the corresponding byte indicates what is an optimal write strategy (WS) in the writing speed indicated by the disc information.

Namely, bits within the $Q^{th}$ byte indicates write strategy (WS) types in one-to-one correspondence, respectively to mean total eight kinds of the write strategy (WS) types. Specifically, 'b0', 'b1', and 'b7' mean $1^{st}$, $2^{nd}$, and $8^{th}$ type write strategies @S1, @S2, and WS 8, respectively. If a bit value in the entire bits is '1b', the write strategy (WS) of the corresponding type becomes the optimal write strategy (WS) type within the corresponding writing speed.

Namely, one of eight bits within the $Q^{th}$ byte becomes '1b' only, while each of the rest bits will be '0b'. FIG. 7A shows that the $Q^{th}$ byte becomes '0000 0010b' if the $2^{nd}$ type write strategy WS2 becomes the optimal write strategy (WS) of the corresponding writing speed for example. Yet, FIG. 7A exemplarily shows the example of representing the optimal write strategy (WS) only. And, it is apparent that the optimal write strategy (WS) type can be represented in various ways.

FIG. 7B shows an example of recording disc information according to the fourth embodiment of the present invention.

Referring to FIG. 7B, $N^{th}$, $L^{th}$, and $M^{th}$ bytes are areas where the entire disc information record the same values in common. '0000 0111b' in the $N^{th}$ byte means three kinds (e.g., 1×, 2×, and 5×) of writing speeds applicable by a corresponding disc. '0000 1111b' in the $L^{th}$ byte means four kinds of write strategies (WS), which are $1^{st}$ to $4^{th}$ type write strategies WS1 to WS4, applicable by the corresponding disc. And, '0000 0010b' means two recording layers existing within the corresponding disc.

For example, FIG. 7B shows that the $1^{st}$ and $2^{nd}$ type write strategies WS1 and WS2 are selected in the 1× speed, the $1^{st}$ and $2^{nd}$ type write strategies WS1 and WS2 are selected in the 2× speed, and the $2^{nd}$ and $3^{rd}$ type write strategies WS2 and WS3 are selected in the 4× speed.

Moreover, in order to enable a record playback apparatus (FIG. 8) to set up an optimal write strategy (WS) quickly, a disc manufacturer records information indicating a type of the optimal write strategy (WS) of the corresponding writing speed in $Q^{th}$ byte. In FIG. 7B, the $Q^{th}$ byte is set to '0000 0010b' by selecting the $2^{nd}$ type write strategy WS2 as the optimal in the 2× speed or to '0000 0100b' by selecting the $3^{rd}$ type write strategy WS3 as the optimal in the 4× speed.

Hence, each of the $Q^{th}$ bytes within '04h~07h' as the disc information related to the 2× speed will be set to the same '0000 0010b' and each of the $Q^{th}$ bytes within '08h~11h' as the disc information related to the 4× speed will be set to the same '0000 0100b'.

Moreover, $P^{th}$~$111^{th}$ bytes within the disc information are areas for recording the write strategy (WS) meant by the corresponding disc information. Hence, the write strategy (WS) will be recorded in each of the corresponding disc information. In FIG. 7B, '04h' as the $5^{th}$ disc information writes parameters for the $1^{st}$ type write strategy WS1 in the $P^{th}$~$111^{th}$ bytes, and '11h' as the $12^{th}$ disc information writes parameters for the $3^{rd}$ type write strategy WS3 in the $P^{th}$~$111^{th}$ bytes.

In summary of the example of FIG. 7B, applicable writing speed information, applicable write strategy (WS) types, and number information of recording layers existing within a disc are recorded in the $N^{th}$, $L^{th}$, and $M^{th}$ bytes, of which values are shared by the entire disc information, within the disc information, respectively. The information indicating the optimal write strategy (WS) type in the corresponding writing speed is recorded by the same value in the $Q^{th}$ byte within the disc information. And, each of the disc information records parameters for intrinsic write strategy (WS) in the $P^{th}$~$111^{th}$ bytes.

FIG. 8 is a block diagram of an optical disc record playback according to the present invention.

Referring to FIG. 8, a recording and/or reproducing apparatus according to the present invention includes a record/playback unit 10 carrying out recording and/or playback on an optical disc and a control unit 20 controlling the record record playback unit 10.

The control unit 20 gives a recording or playback command for a specific area, and the record/playback unit 10 caries out the recording/playback for the specific area according to the command of the control unit 20. Specifically, the record/playback unit 10 may include an interface unit 12 performing communications with the host, or an external device, a pickup unit 11 directly recording data on the optical disc or playing back the data, a data processor 13 receiving a playback signal from the pickup unit 11 to restore into a necessary signal value or modulating to deliver a signal to be recorded into a signal to be recorded on the optical disc, a servo unit 14 reading out a signal from the optical disc correctly or controlling the pickup unit 11 to record a signal on the optical disc correctly, a memory 15 temporarily storing disc control information including disc control information, and a microcomputer 16 responsible for controlling the above-described elements within the record playback unit 10. In the above system, it is also possible to control the recording and/or reproducing of data without the control unit 20. In that that case, the Microcomputer 16 may control all units in the record/playback unit 10 as performing the function of the control unit 10.

A recording process of an optical disc according to the present invention is explained in detail as follows.

First of all, once an optical disc is loaded in the optical recording and reproducing apparatus, the entire disc management information within the disc is read out to be temporarily stored in the memory 15 of the record/playback unit 10. And, various kinds of the disc management information are utilized for the record/playback of the optical disc. Specifically, the management information stored in the memory 15 includes disc information of the present invention. Hence, the recording layer information, writing speed information, and write strategy applicable to the corresponding writing speed recorded within the disc information are read out to be stored in the memory.

For instance, an applicable writing speed and write strategy of the loaded disc are determined based on the flag information indicating applicability of a specific writing speed and write strategy information indicating a usable write strategy type and its parameters included in the management information.

If intending to perform a writing on a specific area within the optical disc the control unit 20 renders such an intent into a writing command and then delivers it to the record/playback unit 10 together with data for writing location information to be recorded. After receiving the writing command, the microcomputer 16 decides the corresponding writing speed applied to an intended recording layer within the optical disc from the management information stored in the memory 15 and then performs the writing command using the optimal write strategy by referring to the decided writing speed.

Accordingly, the present invention provides various methods of providing disc control information coping with higher writing speed in a high-density optical disc, thereby enabling to uniformly apply the standardized disc control information to efficiently cope with the record/playback of the optical disc.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of recording control information on a recording medium, comprising steps of:
providing at least one control information, the control information provided per writing speed applicable to a corresponding recording layer, the control information including applicable recording speed information; and
recording the control information on a specific area of the recording medium.

2. The method of claim 1, wherein the applicable recording speed information included in the control information indicates presence or non-presence of applicability of each writing speed.

3. The method of claim 1, wherein the applicable recording speed information is set to allow a lower writing speed if a higher writing speed is allowed.

4. The method of claim 1, wherein the applicable recording speed information is set with a value indicating whether or not a recording speed is applicable.

5. The method of claim 4, wherein the applicable recording speed information is set with the value in bit position.

6. The method of claim 5, wherein a lower recording speed in the applicable recording speed information is set with a value depending upon an applicability of a higher recording speed.

7. The method of claim 1, wherein information on a number of the recording layers within the recording medium is further included within the control information.

8. The method of claim 1, wherein write strategy type information and write strategy parameters to be applied to the write strategy type information are further included within the control information.

9. The method of claim 1, wherein one or more applicable write strategy type information are further included within the control information.

10. The method of claim 9, wherein best write strategy type information appropriate for the corresponding layer and the corresponding writing speed among applicable write strategy types is further included in the control information.

11. The method of claim 9, wherein the write strategy information included in the control information is divided into basic write strategy information and optional write strategy information.

12. The method of claim 1, wherein intrinsic recording layer information and writing speed information meant by the corresponding control information are further included in the control information.

13. The method of claim 1, wherein the specific area is a management area of the recording medium, the management area is a preloaded area on manufacturing of the recording medium or a copied area to a recordable area from the preloaded area.

14. The method of claim 1, wherein the control information is disc information (DI) configured in a PIC (permanent information and control data) area in Blu-ray disc.

15. The method of claim 1, wherein the control information is physical format information.

16. A data structure for storing speed information, characterized in that the speed information includes one or more recording speed flags to indicate whether a corresponding recording speed is applicable to a recording medium or not, wherein a first speed flag for a first recording speed lower than a second recording speed is set to be dependent on a second speed flag for the second recording speed.

17. The data structure of claim 16, wherein the first speed flag is set to indicate that the first recording speed is applicable when the second speed flag indicates that the second recording speed is applicable.

18. The data structure of claim 16, further comprises recording parameters depending on each of the first and second recording speeds are further included.

19. The data structure of claim 18, wherein the recording parameters includes a write strategy type for at least one of the first and second recording speeds.

20. The data structure of claim 19, wherein the recording parameters includes a write strategy parameters for the write strategy type.

21. The data structure of claim 18, wherein the recording parameters is provided to a specific recording layer within the recording medium.

22. The data structure of claim 16, wherein each of the first and second speed flags is indicated by one bit.

23. A method of recording speed information on a recording medium, comprising the step of:
recording speed information on a specific area of the recording medium, wherein the speed information includes one or more recording speed flags to indicate whether a corresponding speed is applicable to the recording medium or not; and
wherein a first speed flag for a first recording speed lower than a second recording speed is set to be dependent on a second speed flag for the second recording speed.

24. A recording medium having speed information, the speed information includes one or more recording speed flags to indicate whether a corresponding speed is applicable to the recording medium or not, wherein a first speed flag for a first recording speed lower than a second recording speed is set to be dependent on a second speed flag for the second recording speed.

25. The recording medium of claim 24, wherein the first speed flag is set to indicate that the first recording speed is applicable when the second speed flag indicates that the second recording speed is applicable.

26. The recording medium of claim 25, wherein each of the first and second speed flags is indicated by one bit.

27. The recording medium of claim 26, wherein the recording medium is a recordable DVD.

28. The recording medium of claim 26, wherein the recording medium is a recordable Blu-ray disc.

29. A method of recording main data on a recording medium, comprising steps of:
reading speed information recorded on the recording medium, the speed information including one or more recording speed flags to indicate whether a corresponding recording speed is applicable to the recording medium or not;
storing the speed information in a data storage; and
utilizing the stored speed information to record the main data on the recording medium,
wherein a first speed flag for a first recording speed lower than a second recording speed is set to be dependent on a second speed flag for the second recording speed.

30. The method of claim 29, wherein the step of the reading the speed information comprises reading the first speed flag being set to indicate that first recording speed is applicable when the second speed flag indicate that the second recording speed is applicable.

31. The method of claim 29, wherein the data storage is a buffer in a data recording/reproducing apparatus.

32. The method of claim 29, wherein both the first and second speed flags are represented by one information byte.

33. The method of claim 32, wherein the first and second speed flags are respectively represented with values of bit positions in the information byte.

34. The method of claim 29, further comprising
reading recording parameters depending on each of the first and second recording speeds from the recording medium, and
storing the recording parameters in the data storage.

35. A method of recording data on a recording medium, comprising steps of:
storing speed information read from the recording medium, the speed information including one or more recording speed flags to indicate whether a corresponding recording speed is applicable to the recording medium or not; and
reading the stored speed information to record the data on the recording medium,
wherein a first speed flag for a first recording speed lower than a second recording speed is set to be dependent on a second speed flag for the second recording speed.

36. The method of claim 35, wherein the step of the storing the speed information comprises storing the first speed flag being set to indicate that first recording speed is applicable when the second speed flag indicate that the second recording speed is applicable.

37. The method of claim 35, wherein the step of the storing the speed information comprises storing the speed information in a buffer within a data recording/reproducing apparatus.

38. The method of claim 35, wherein both the first and second speed flags are represented by one information byte.

39. The method of claim 38, wherein the first and second speed flags are respectively represented with values of bit positions in the information byte.

40. The method of claim 35, further comprising
reading recording parameters depending on each of the first and second recording speeds from the recording medium, and
storing the recording parameters in a buffer within a data recording/reproducing apparatus.

41. A method of recording data on a recording medium, comprising steps of:
reading control information recorded on a specific area of the recording medium, the control information including speed information and write strategy information, the speed information including one or more recording speed flags to indicate whether a corresponding recording speed is applicable to the recording medium or not, the write strategy information including recording speed parameter; and utilizing the control information to record main data on the recording medium, wherein a first speed flag for a first recording speed lower than a second recording speed is set to be dependent on a second speed flag for the second recording speed.

42. The method of claim 41, further comprising:

storing the first speed flag being set to indicate that first recording speed is applicable when the second speed flag indicate that the second recording speed is applicable.

43. The method of claim 41, wherein both the first and second speed flags are represented by one information byte.

44. The method of claim 43, wherein the first and second speed flags are respectively represented with values of bit positions in the information byte.

45. The method of claim 41, further comprising storing the read control information in a buffer within a data recording/reproducing apparatus.

* * * * *